US012075159B2

(12) United States Patent
Hu et al.

(10) Patent No.: US 12,075,159 B2
(45) Date of Patent: Aug. 27, 2024

(54) GIMBAL SERVO CONTROL METHOD AND CONTROL DEVICE

(71) Applicant: SZ DJI TECHNOLOGY CO., LTD., Shenzhen (CN)

(72) Inventors: Xiao Hu, Shenzhen (CN); Guanhua Su, Shenzhen (CN); Ang Liu, Shenzhen (CN); Litian Zhang, Shenzhen (CN); Zhaoliang Peng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 1289 days.

(21) Appl. No.: 16/643,440

(22) PCT Filed: Apr. 10, 2017

(86) PCT No.: PCT/CN2017/079973
§ 371 (c)(1),
(2) Date: Aug. 17, 2020

(87) PCT Pub. No.: WO2018/187916
PCT Pub. Date: Oct. 18, 2018

(65) Prior Publication Data
US 2020/0389593 A1 Dec. 10, 2020

(51) Int. Cl.
*H04N 23/68* (2023.01)
*B64C 39/02* (2023.01)
(Continued)

(52) U.S. Cl.
CPC ....... *H04N 23/6812* (2023.01); *B64C 39/024* (2013.01); *B64D 47/08* (2013.01);
(Continued)

(58) Field of Classification Search
CPC .............. H04N 23/6812; H04N 23/695; B64C 39/024; B64D 47/08; G03B 17/561;
(Continued)

(56) References Cited

U.S. PATENT DOCUMENTS

2005/0004723 A1 1/2005 Duggan et al.
2012/0287274 A1* 11/2012 Bevirt .................... H04N 7/185
348/E7.085
(Continued)

FOREIGN PATENT DOCUMENTS

CN 102143324 A 8/2011
CN 102589527 A 7/2012
(Continued)

OTHER PUBLICATIONS

The World Intellectual Property Organization (WIPO) International Search Report and Written Opinion for PCT/CN2017/079973 Jan. 12, 2018 6 pages.

*Primary Examiner* — Christopher K Peterson
(74) *Attorney, Agent, or Firm* — ANOVA LAW GROUP, PLLC

(57) ABSTRACT

A gimbal servo control method includes obtaining a predicted flight trajectory of an aircraft within a preset time period from a current time, and adjusting an attitude of a gimbal carried by the aircraft according a predicted velocity direction of the aircraft at a point of the predicted flight trajectory.

20 Claims, 7 Drawing Sheets

(51) Int. Cl.
   *B64D 47/08* (2006.01)
   *B64U 101/30* (2023.01)
   *G03B 17/56* (2021.01)

(52) U.S. Cl.
   CPC ........ *G03B 17/561* (2013.01); *B64U 2101/30* (2023.01); *B64U 2201/20* (2023.01)

(58) Field of Classification Search
   CPC ................ G03B 17/566; G03B 15/006; B64U 2101/30; B64U 2201/20; G05D 3/12
   See application file for complete search history.

(56) References Cited

U.S. PATENT DOCUMENTS

2019/0004509 A1* 1/2019 Zheng .................... G05D 1/005
2020/0043352 A1* 2/2020 Achtelik ................ G05D 1/102

FOREIGN PATENT DOCUMENTS

| | | |
|---|---|---|
| CN | 104035446 A | 9/2014 |
| CN | 104828256 A | 8/2015 |
| CN | 204615968 U | 9/2015 |
| CN | 205103661 U | 3/2016 |
| CN | 105468014 A | 4/2016 |
| CN | 105487552 A | 4/2016 |
| CN | 105652891 A | 6/2016 |
| CN | 205507550 U | 8/2016 |
| CN | 205787918 U | 12/2016 |
| WO | 2015132281 A1 | 9/2015 |

\* cited by examiner

GIMBAL SERVO CONTROL METHOD AND CONTROL DEVICE

CROSS-REFERENCE TO RELATED APPLICATION

This application is a National Stage entry under 35 U.S.C. § 371 of International Application No. PCT/CN2017/079973, filed on Apr. 10, 2017, the entire content of which is incorporated herein by reference.

TECHNICAL FIELD

The present disclosure relates to the technical field of aerial vehicle, and in particular relates to a gimbal servo control method and a control device.

BACKGROUND TECHNOLOGY

With the development of unmanned aerial vehicle (UAV) technology, multi-rotor UAVs are becoming more popular and widely used in the aerial photography field. Aerial photography technology can be used in the fields of disaster assessment, rescue and disaster relief, field reconnaissance, and military exercises, etc. As small UAVs enter the consumer market, consumers are more exposed to aerial photography technology and in more pursuit of fun from aerial photography.

Gimbal is needed in UAV aerial photography. The gimbal is a supporting device for mounting and fixing camera device in a monitoring system. The gimbal controls the shooting direction of the camera or other device. In general, a three-axis gimbal can perform attitude control in the three axes of pitch, roll, and yaw, to set the shooting direction of the camera device to be in a certain direction. For example, the shooting direction may be set in the direction of the heading direction of the aircraft, or in a certain shooting direction controlled by the user.

It has become a research hot topic on how to better control the attitude of the gimbal to satisfy the user's flight experience with the aircraft.

SUMMARY OF THE DISCLOSURE

In view of this, embodiments of the present disclosure provide a gimbal servo control method and a control device, so that the attitude of the gimbal of the aircraft can be adjusted according to a flight trajectory of the aircraft.

A first aspect of the embodiments of the present disclosure provides a gimbal servo control method, including: obtaining a predicted flight trajectory of an aircraft within a preset time period from a current time; adjusting an attitude of a gimbal carried by the aircraft according to a predicted velocity direction of the aircraft at a point of the predicted flight trajectory.

A second aspect of the embodiments of the present disclosure provides a control device, including a controller and a control interface.

The controller is configured to obtain a predicted flight trajectory of an aircraft within a preset time period from a current time and adjust an attitude of a gimbal carried by the aircraft through the control interface according to a predicted velocity direction of the aircraft at a point of the predicted flight trajectory.

In the embodiments of the present disclosure, the attitude of the gimbal carried by the aircraft can be adjusted based on the predicted velocity direction of the point on the predicted flight trajectory of the aircraft within the preset time period from the current time, and the attitude of the gimbal may be bound to the flight trajectory based on velocity direction, to better ensure that the attitude of the gimbal can be automatically adjusted according to the flight trajectory, which satisfies the need to adjust the attitude of the gimbal automatically and intelligently.

BRIEF DESCRIPTION OF THE DRAWINGS

In order to more clearly explain the embodiments of the present disclosure or the technical solutions in the existing technology, the drawings used in the embodiments are briefly introduced below. Apparently, the drawings in the following description are only some embodiments of the present disclosure. For those of ordinary skill in the art, other embodiments may be obtained based on these drawings without creative efforts.

DETAILED DESCRIPTION OF THE EMBODIMENTS

In the following, the technical solutions in the embodiments of the present disclosure will be clearly and completely described with reference to the drawings in the embodiments of the present disclosure. Apparently, the described embodiments are only some of the embodiments of the present disclosure, but not all of the embodiments.

Based on the embodiments of the present disclosure, all other embodiments obtained by a person of ordinary skill in the art without making any creative effort belong to the scope of the present disclosure.

Figure 1:
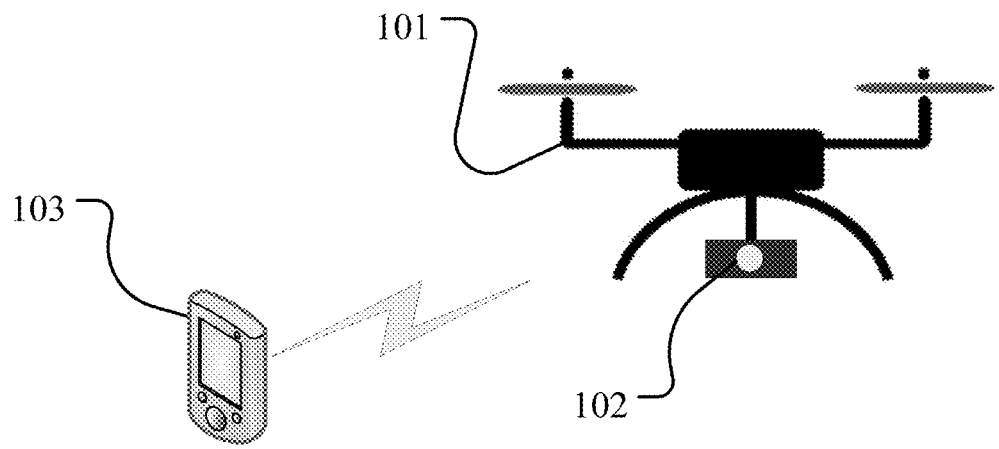
FIG. 1 is a schematic structural diagram of a flight control system according to some embodiments of the present disclosure.

FIG. 1 is a schematic structural diagram of a flight control system according to some embodiments of the present disclosure. The system includes an aircraft, a gimbal 102 carried by the aircraft, and a ground control device 103 configured to control the aircraft or control both the aircraft and the gimbal 102 at the same time. The aircraft may generally be various types of UAV 101, such as a four-rotor UAV or a six-rotor UAV. The gimbal 102 carried by the UAV 101 may be a three-axis gimbal; that is, an attitude of the gimbal 102 can be controlled on three axes, i.e., pitch, roll, and yaw, to determine an orientation of the gimbal 102, so that a camera device mounted on the gimbal 102 can complete tasks such as aerial photography of corresponding targets.

The UAV 101 may have multiple operation modes. In one embodiment, it may include a first operation mode, a second operation mode, etc. In the first operation mode, the user can separately control a flight of the UAV 101 and the attitude of the gimbal 102, such that the UAV 101 flies according to the user's desire, and the gimbal 102 completes tasks such as recording in the direction that the user desires. In the second operation mode, the flight trajectory of the UAV 101 can be predicted, and the attitude of the gimbal 102 can be controlled in advance based on the flight trajectory to complete a special flight experience. For example, in the second operation mode, the flight trajectory of the UAV 101 can be better predicted for a certain period of time in the future, and the attitude of the gimbal 102 can be adjusted based on the predicted velocity direction at a point on the flight trajectory. The camera device mounted on the gimbal 102 may capture images in the predicted velocity direction, so that users can have a realistic flight experience.

The UAV 101 includes a flight controller, and the flight controller establishes a communication connection with the ground control device 103 through a wireless connection (such as a wireless connection based on Wi-Fi or radio frequency communication, etc.). The ground control device 103 may be a controller with a stick, which controls the aircraft by a stick steering amount. The ground control device 103 may also be a smart device such as a smart phone or a tablet computer, and may control the UAV 101 to fly automatically by configuring a flight trajectory on a user interface (UI) or by somatosensory method, etc.

Figure 2:
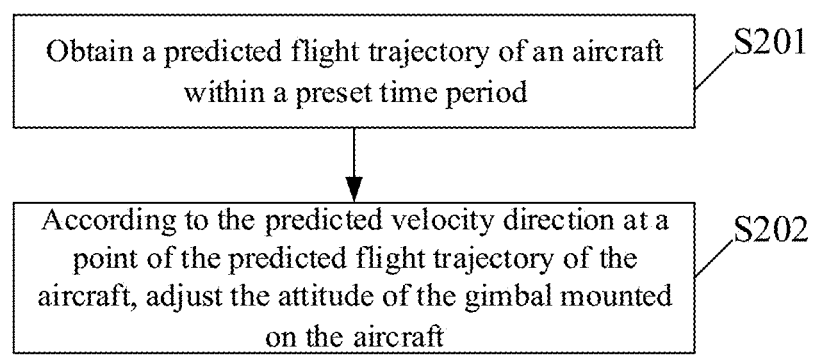
FIG. 2 is a flowchart illustrating a gimbal servo control method according to some embodiments of the present disclosure.

Referring to FIG. 2, in one embodiment of the present disclosure, a gimbal servo control method is provided, which may include at least the following steps:

Step S201: Obtaining a predicted flight trajectory of an aircraft within a preset time period from a current time.

Specifically, the flight trajectory of the aircraft in a subsequent period of time (that is, within a preset time period from a current time) may be predicted. The preset time period is relatively short, and is usually in seconds, e.g., 3 s, 5 s, etc.

Step S202: Adjusting the attitude of the gimbal mounted on the aircraft according to the predicted velocity direction at a point of the predicted flight trajectory of the aircraft.

The gimbal is carried by the aircraft, and is configured to mount and fix the camera device that is configured to capture image information of the aircraft during flight. The gimbal can control the rotation of the camera device in three rotation axes. The three rotation axes are the pitch axis, the yaw axis, and the roll axis.

Adjusting the attitude of the gimbal may be adjusting at least one of three angles: a pitch angle, a yaw angle, and a roll angle.

Figure 3:
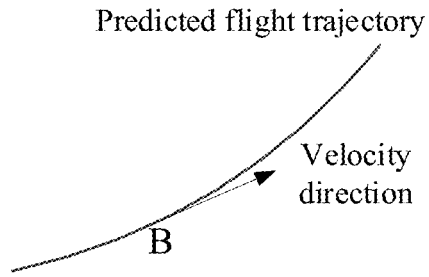
FIG. 3 is a schematic diagram of obtaining a velocity direction according to some embodiments of the present disclosure.

Specifically, point B may be selected on the predicted flight trajectory, and the attitude of the gimbal may be adjusted according to the predicted velocity direction at point B. The velocity direction at point B is a direction along a tangent of the flight trajectory at this point, as shown in FIG. 3.

Preferably, the point may be a point in a first half of the predicted flight trajectory. When the point is one point in the first half of the predicted flight trajectory, the image information finally obtained may not lag or be too ahead.

Optionally, the point may be a point in a second half of the predicted flight trajectory. Of course, the point may also be a start point of the predicted flight trajectory. That is, the attitude of the gimbal may be adjusted according to the current velocity direction of the aircraft. Alternatively, the point may be an end point of the predicted flight trajectory.

In the embodiments of the present disclosure, only the prediction of a future flight trajectory is described, and the attitude of the gimbal may be adjusted according to the predicted flight trajectory. It can be known that the aircraft continuously predicts the flight trajectory within a preset time period from a current time at a certain frequency during the entire flight, and then adjusts the attitude of the gimbal according to each predicted flight trajectory thereby adjusting the attitude of the gimbal during the entire flight. For example, the aircraft performs steps S201 and S202 every several hundred milliseconds during the flight.

The embodiments of the present disclosure bind the predicted velocity direction of a certain point on the flight trajectory with the attitude of the gimbal, to adjust the attitude of the gimbal, and then adjusts the direction of the camera device mounted on the gimbal to capture image information, so that the user can have a more realistic flight experience when controlling the UAV.

Figure 4:
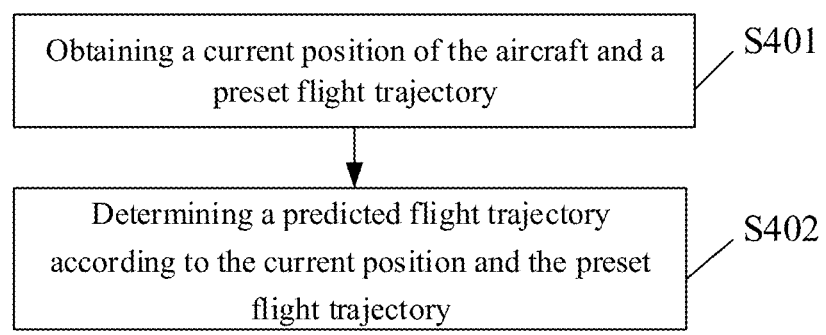
FIG. 4 is a flowchart illustrating a method for obtaining a predicted flight trajectory of an aircraft according to some embodiments of the present disclosure.

In a possible implementation manner of the embodiments of the present disclosure, obtaining the predicted flight trajectory of the aircraft within the preset time period from the current time may include at least the following steps, as shown in FIG. 4:

Step S401: Obtaining a current position of the aircraft and a preset flight trajectory.

Step S402: Determining a predicted flight trajectory according to the current position and the preset flight trajectory.

Specifically, the aircraft flies according to the flight trajectory generated by algorithm, and the predicted flight trajectory can be determined according to the current geographic location of the aircraft and the preset flight trajectory. The geographic position of the aircraft may be determined by, but not limited to, a GPS.

Specifically, the flight trajectory of the aircraft may be set by the user before the aircraft takes off, or may be set during the flight of the aircraft. The aircraft may automatically fly along the preset flight trajectory without manual operation. A method for setting up may be that the user selects several points on a map or the image, and the aircraft generates the flight trajectory according to the several points. The method for setting up may also be that the user directly draws out the trajectory manually on the map or image, etc., and then the aircraft processes the trajectory (such as smoothing or other processing manners), and finally generates the flight trajectory. The map or image may be displayed on a display screen of a control device or a mobile terminal bound to the aircraft.

The embodiments of the present disclosure can predict a flight trajectory in a subsequent period of time according to the preset flight trajectory and the current position of the aircraft.

Figure 5:
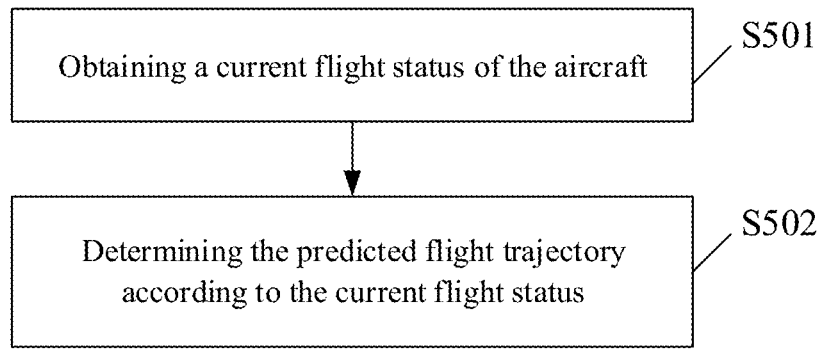
FIG. 5 is a flowchart illustrating another method for obtaining a predicted flight trajectory of an aircraft according to some embodiments of the present disclosure.

In a possible implementation manner of the embodiments of the present disclosure, obtaining the predicted flight trajectory of the aircraft within the preset time period from the current time may include at least the following steps, as shown in FIG. 5:

Step S501: Obtaining a current flight status of the aircraft.

Step S502: Determining the predicted flight trajectory according to the current flight status.

Specifically, the current flight status may include at least the current flight velocity, etc., where the velocity includes a velocity direction and a velocity magnitude. According to the current velocity of the aircraft in combination with flight dynamics, a predicted flight trajectory of the aircraft within the preset time period from the current time can be obtained. The method to predict the flight trajectory may be, but is not limited to, motion primitive, minimum-snap trajectory generation, etc.

Optionally, in this embodiment, the aircraft may fly in an intelligent mode. In this mode, the aircraft may fly following a target object, and the target object may be any movable or stationary object. The aircraft may fly around a target object, and the target object may be a place, or an object being surrounded that are selected by the user. The aircraft may fly toward a direction or a position after the user specifies the direction or the position.

Optionally, in this embodiment, in addition to the current flight status of the aircraft, a control instruction for the aircraft input by the user may also be obtained. The control instruction refers to an instruction input by the user for changing the flight status of the aircraft. Thus, according to the current flight status of the aircraft and the control instruction input by the user, a predicted flight trajectory of the aircraft within the preset time period from the current time is obtained. The control instruction may be specifically configured to control the flight status of the aircraft. The control instruction may be issued by a user through a control device or a mobile terminal bound to the aircraft.

Specifically, the user can operate an operation stick on a control device bound to the aircraft to change the stick steering amount of the operation stick. A corresponding control instruction is then generated according to the stick steering amount of the stick and sent to the aircraft to control the flight status of the aircraft. For example, the user may control the flight velocity of the aircraft through an "elevator" stick steering amount (e.g., if elevator is positive, the aircraft accelerates), control the attitude of the aircraft through a "throttle" stick steering amount, and control the aircraft through a "rudder" stick steering amount to make coordinated turns to change the flight direction.

Specifically, the user can also operate the mobile terminal bound to the aircraft to generate corresponding control instructions and send them to the aircraft, thereby controlling the flight status of the aircraft. The mobile terminal may be, but is not limited to, a mobile phone, a bracelet, smart goggles, or a head-mounted display (HMD) device. The user can click a corresponding area or a corresponding icon on the display screen of the mobile phone to generate the corresponding control instructions and send them to the aircraft, thereby controlling the flight status of the aircraft. For example, when the user clicks the acceleration button on the screen, an acceleration instruction can be generated and sent to the aircraft, so that the aircraft can be controlled to accelerate; when the user clicks the left turn button on the screen, a left turn instruction can be generated and sent to the aircraft, so that the aircraft can be controlled to turn left, and so on. The user can also control the aircraft by inputting somatosensory control signals into mobile phones, bracelets, smart glasses or head-mounted display devices. When a user holds or wears a mobile terminal, a corresponding control instruction is generated by the user controlling the attitude of the mobile terminal and sent to the aircraft, thereby controlling the flight status of the aircraft. For example, when a user waves his arm to the right, based on movement data generated by a motion sensor of a mobile phone or a bracelet when detecting the rightward movement, a right-turn control instruction is generated and sent to the aircraft to control the aircraft to turn right. The velocity at which the user waves his arm may determine the velocity at which the aircraft turns right. It can be known that users can preset a mapping relationship between different actions and control instructions according to their own usage habits.

In flight, the aircraft may also have an obstacle avoidance function, that is, a distance from the obstacle during flight is always not less than a preset distance to ensure the safe flight of the aircraft.

In the embodiments of the present disclosure, the flight trajectory of the aircraft in the subsequent period of time may be predicted according to the current flight status of the aircraft or in combination with the control instruction input by the user.

Figure 6:
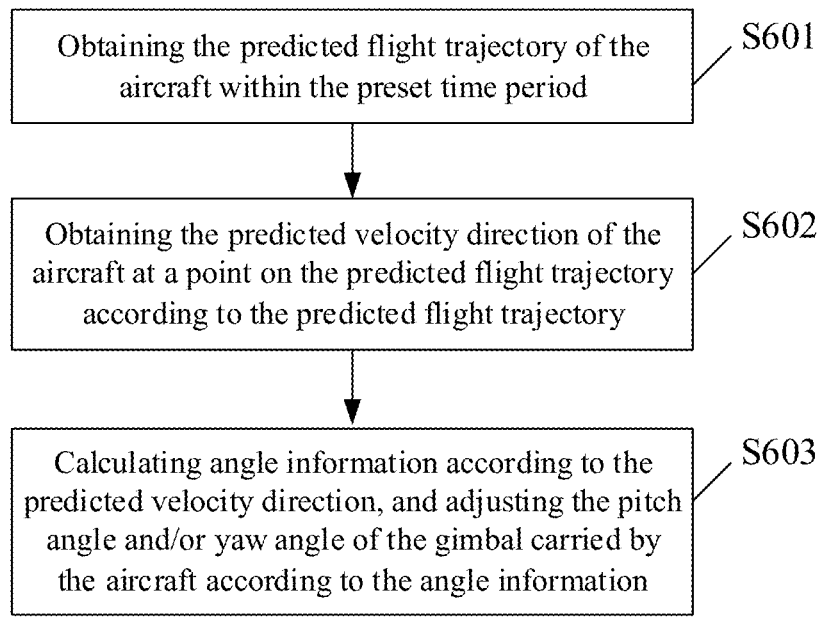
FIG. 6 is a flowchart illustrating a control method for adjusting a gimbal according to some embodiments of the present disclosure.

Based on the above description, adjusting the attitude of the gimbal mounted on the aircraft, as mentioned in the embodiments of the present disclosure, may be adjusting the pitch angle and/or the yaw angle of the gimbal. The specific implementation manner is shown in FIG. 6 and includes at least the following steps:

Step S601: Obtaining the predicted flight trajectory of the aircraft within the preset time period from the current time period.

Step S602: Obtaining the predicted velocity direction of the aircraft at a point on the predicted flight trajectory according to the predicted flight trajectory.

Step S603: Calculating angle information according to the predicted velocity direction, and adjusting the pitch angle and/or yaw angle of the gimbal carried by the aircraft according to the angle information.

Figure 7:
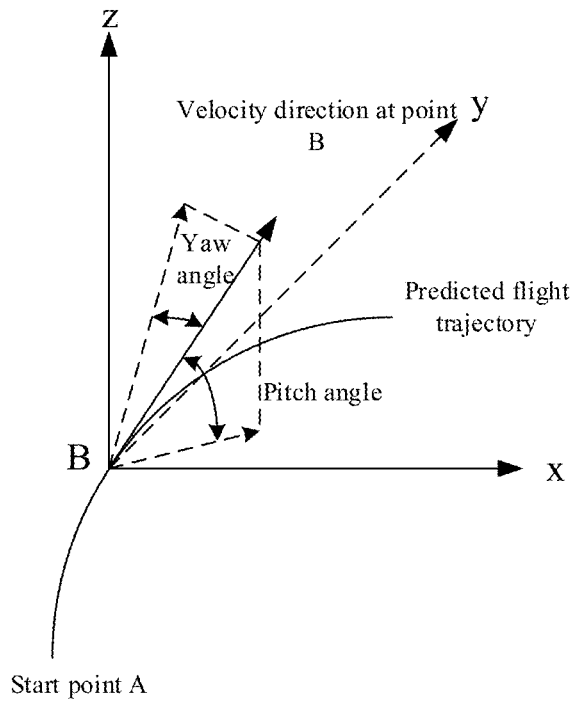
FIG. 7 is a schematic diagram of predicting pitch and yaw directions according to some embodiments of the present disclosure.

For example, as shown in FIG. 7, point A is the start point of the predicted flight trajectory, and point B is the point of the predicted flight trajectory, that is, a gimbal yaw direction calculation point. In the coordinate system with point B as origin, a horizontal direction to the right is a positive direction of x axis, a horizontal direction to the front is a positive direction of y axis, and a vertical direction upward is a positive direction of z axis. Then, the angle between the predicted velocity direction at point B and an xBy plane can determine the pitch angle of the gimbal, and the angle between the predicted velocity direction at point B and a yBz plane can determine the yaw angle of the gimbal.

Accordingly, in this embodiment, the adjustment can be performed only on the pitch angle of the gimbal, only on the yaw angle of the gimbal, or on both the pitch angle and yaw angle of the gimbal at the same time.

In the embodiments of the present disclosure, a trajectory point can be selected on the predicted flight trajectory, and the pitch angle and/or yaw angle of the gimbal can be adjusted according to the velocity direction at the trajectory point.

Figure 8:
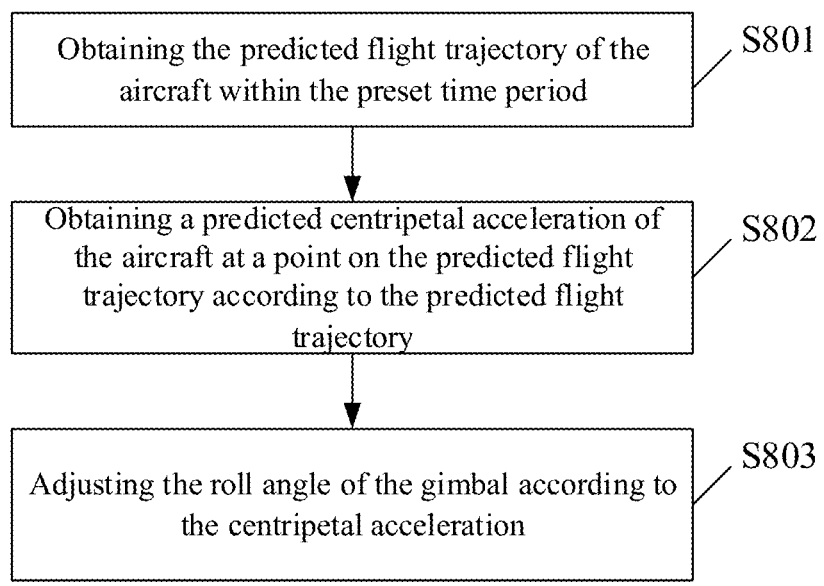
FIG. 8 is a flowchart illustrating another control method for adjusting a gimbal according to some embodiments of the present disclosure.

In a possible implementation manner of the embodiments of the present disclosure, the attitude of the gimbal carried by the aircraft may also be adjusted by adjusting the roll angle of the gimbal. The specific implementation manner is shown in FIG. 8 and may include at least the following steps:

Step S801: Obtaining the predicted flight trajectory of the aircraft within the preset time period from the current time.

Step S802: Obtaining a predicted centripetal acceleration of the aircraft at a point on the predicted flight trajectory according to the predicted flight trajectory.

The point mentioned in this embodiment may be the same point as the point associated with the pitch angle and/or the yaw angle in the previous embodiment.

Step S803: Adjusting the roll angle of the gimbal according to the centripetal acceleration.

Specifically, a value of the centripetal acceleration can be obtained according to a velocity value of the aircraft at the point and the trajectory radius, and then the roll angle of the gimbal can be adjusted according to the value of the centripetal acceleration.

A tangent value of the roll angle of the gimbal is proportional to a square of the velocity value, and inversely proportional to the trajectory radius. If the roll angle is represented by "roll", a formula for calculating the roll angle can be:

$$\tan(\text{roll})*9.8=V^2/R$$

In the embodiments of the present disclosure, a trajectory point can be selected on the predicted flight trajectory, and the roll angle of the gimbal can be adjusted according to the centripetal acceleration at the trajectory point.

Figure 9:
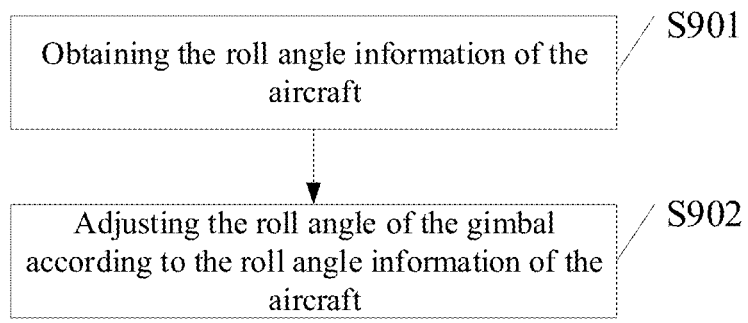
FIG. 9 is a flowchart illustrating another control method for adjusting a gimbal according to some embodiments of the present disclosure.

In addition, the embodiments of the present disclosure also provide another roll angle adjustment method. In this adjustment method, the roll angle of the gimbal can be specifically adjusted according to the roll angle of the aircraft. As shown in FIG. 9, the method includes the following steps.

Step S901: Obtaining the roll angle information of the aircraft. The roll angle information of the aircraft may be obtained by measuring a current roll angle of the aircraft using a motion sensor, such as a gyroscope, that is contained in the aircraft.

Step S902: Adjusting the roll angle of the gimbal according to the roll angle information of the aircraft. In one embodiment, the roll angle information of the aircraft obtained in S901 may be directly used as the roll angle of the gimbal. In other embodiments, when the roll angle of the gimbal is adjusted according to the roll angle of the aircraft, a formula, gimbal roll=K*aircraft roll, can be used to obtain the roll angle, roll, of the gimbal, where K represents a scale factor obtained by statistical learning. The roll angle of the gimbal is proportional to the roll angle of the aircraft.

Figure 10:
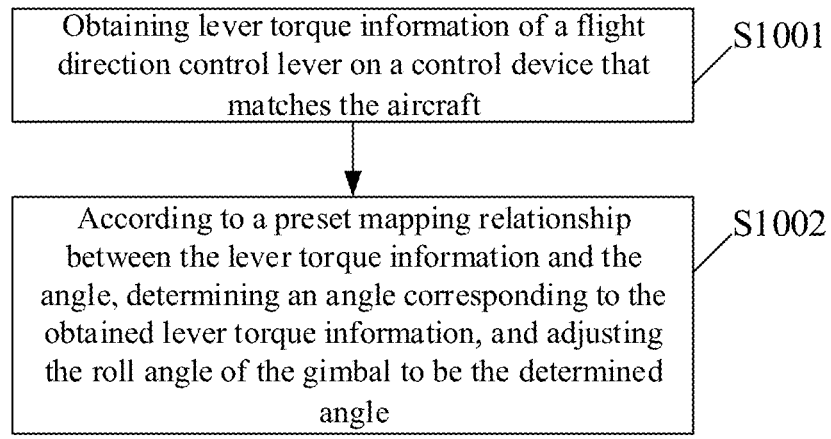
FIG. 10 is a flowchart illustrating another control method for adjusting a gimbal according to some embodiments of the present disclosure.

In addition, the embodiments of the present disclosure also provide another method to adjust the roll angle. The specific implementation manner is shown in FIG. 10, which may include at least the following steps:

Step S1001: Obtaining stick steering amount information of a flight direction control stick of a control device coupled to the aircraft.

Specifically, a stick steering amount mapping to the roll angle may be set in advance on the remote control device coupled to the aircraft, and the user may adjust the roll angle by controlling the stick steering amount.

Step S1002: Determining an angle corresponding to the obtained stick steering amount information according to a preset mapping relationship between the stick steering amount information and the angle, and adjusting the roll angle of the gimbal to be the determined angle.

Specifically, the mapping relationship between the stick steering amount information and the angle may be set in advance, and an angle corresponding to the stick information may be found according to the stick steering amount information obtained according to the user's operation on the stick, then the roll angle of the gimbal may be adjusted according to the angle.

For example, when the user turns the stick 30° to the right, a corresponding angle may be found to be 30° according to the mapping relationship, and then the roll angle of the gimbal may be adjusted to 30° (30° to the right along the roll axis). When the user turns the stick 45° to the left, the corresponding angle may be found to be −45° according to the mapping relationship, and then the roll angle of the gimbal may be adjusted to −45° (45° to the left along the roll axis).

In the embodiments of the present disclosure, the roll angle of the gimbal can be adjusted according to the control stick steering amount in the flight direction on the control device coupled to the aircraft.

Based on the foregoing description, in a possible implementation manner of the embodiments of the present disclosure, the attitude of the gimbal carried by the aircraft may also be adjusted by adjusting the pitch angle and the roll angle of the gimbal.

In a possible implementation manner of the embodiments of the present disclosure, the attitude of the gimbal carried by the aircraft may be adjusted by adjusting the yaw angle and the roll angle of the gimbal.

In a possible implementation manner of the embodiments of the present disclosure, the attitude of the gimbal carried by the aircraft may be adjusted by adjusting the pitch angle, the yaw angle, and the roll angle of the gimbal.

Figure 11:
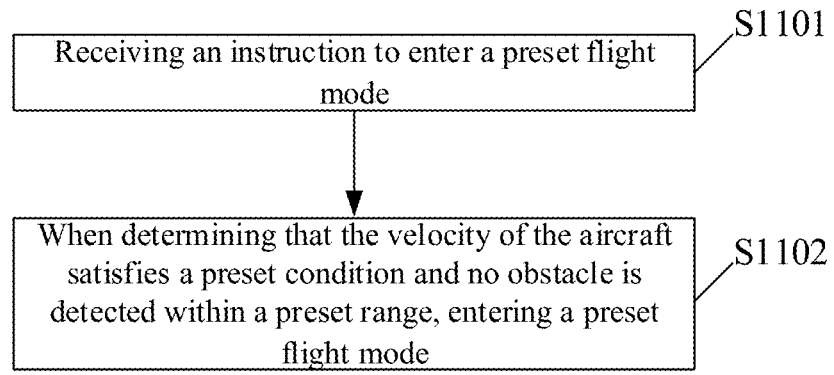
FIG. 11 is a flowchart illustrating an aircraft mode control method according to some embodiments of the present disclosure.

In a possible implementation manner of the embodiments of the present disclosure, before obtaining the predicted flight trajectory of the aircraft within a preset time period from a current time, the method may further include, but is not limited to, the following steps, as shown in FIG. 11.

Step S1101: Receiving an instruction to enter a preset flight mode.

Preferably, the instruction to enter the preset flight mode may be a toss-to-fly instruction. Specifically, when the sensor detects that the aircraft is released from the user's hand, the toss-to-fly instruction may be generated. After receiving the toss-to-fly instruction, the aircraft can generate a driving signal, which is configured to drive the aircraft to generate lift or thrust for the aircraft to take off.

Optionally, the instruction to enter the preset flight mode may also be a stick steering amount instruction. Specifically, the user may issue an instruction through an operation stick of a control device coupled to the aircraft. When the user pushes the operation stick, a change of the stick steering amount of the operation stick may be detected, and a stick steering amount instruction may be generated and sent to the aircraft. The mapping relationship between the stick steering amount and the preset flight mode may be preset.

Optionally, the instruction to enter the preset flight mode may also be a remote control instruction. Specifically, the user can issue an instruction through a confirmation entry button on the control device coupled the aircraft. When the user presses the button, a remote control instruction may be generated and sent to the aircraft. The mapping relationship between the button and the preset flight mode may be preset.

Optionally, the instruction to enter the preset flight mode may also be a preset App instruction. Specifically, the user may issue an instruction through a preset App on the terminal bound to the aircraft. When the user clicks a target area of the preset App control interface, a preset App instruction may be generated and sent to the aircraft. The mapping relationship between the target area and the preset flight mode may be preset.

The instruction to enter the preset flight mode may also be any combination of the above-mentioned toss-to-fly instruction, stick steering amount instruction, remote control instruction, and preset App instruction.

Step S1102: When determining that the velocity of the aircraft satisfies a preset condition and no obstacle is detected within a preset range, entering the preset flight mode.

Specifically, at the time of receiving the instruction to enter the preset flight mode or after receiving the instruction to enter the preset flight mode, it is determined whether the velocity of the aircraft satisfies a preset condition and no obstacle is detected within a preset range. If the velocity of the aircraft satisfies the preset condition and no obstacle is detected within the preset range, the aircraft enters the preset flight mode. If not, the aircraft may fly in a flight mode set by the user before issuing the instruction to enter the preset flight mode.

The embodiments of the present disclosure may provide multiple control instructions for the aircraft to enter the preset flight mode, and determine whether the current status of the aircraft satisfies the conditions for entering the preset flight mode.

Based on the foregoing mentioned embodiments, the aircraft may also control the aircraft according to the somatosensory control signal generated by the mobile terminal bound to the aircraft during flight. That is, physical parameters of the user's body movements may be sensed by the motion sensor, gyroscope, etc., and according to the physical parameters various user movements may be obtained to generate different somatosensory control signals, and control instructions corresponding to different somatosensory control signals may be determined according to preset mapping relationships, and the control instructions may then be set to the aircraft, thereby controlling the flight status of the aircraft.

Specifically, the user can control the aircraft by inputting somatosensory control signals into a mobile phone, a bracelet, smart glasses, or a head-mounted display device to generate control instructions and send the control instructions to the aircraft. For example, when the user waves his arm to the right, when detecting the somatosensory control signal that moves to the right according to the motion sensor, gyroscope, etc., of the mobile phone or bracelet, a right-turn control instruction may be generated and sent to the aircraft to control the aircraft to turn right. The velocity at which the user waves his arm may determine the velocity at which the aircraft turns right. Accordingly, users can preset the mapping relationship between different actions and control instructions according to their own usage habits.

The embodiments of the present disclosure provide a somatosensory control method. During the flight of the aircraft, the aircraft may be controlled by a somatosensory control signal generated by a mobile terminal bound to the aircraft, which facilitates the user's operations and improves user experience.

Based on the foregoing description, the embodiments of the present disclosure further provide a preset flight mode exit scheme, as detailed below. The method further includes receiving instructions to exit the preset flight mode.

Optionally, the instruction to exit the preset flight mode may be a stick steering amount instruction. Specifically, the user may issue an instruction through an operation stick on a control device coupled to the aircraft. When the user pushes the operation stick, a change of the stick steering amount of the operation stick may be detected, and a stick steering amount instruction may be generated and sent to the aircraft. A mapping relationship between the stick steering amount and existing the preset flight mode may be preset. An operation stick for the instruction to exit the preset flight mode may be the same operation stick as the operation stick for the instruction to enter the preset flight mode in the foregoing embodiment, and whether the stick steering amount instruction is an instruction to enter or exist the preset flight mode can be determined according to the value of the stick steering amount of the operation stick. For example, when the stick steering amount is greater than zero, the stick steering amount instruction is the instruction to enter the preset flight mode; and when the stick steering amount is zero, the stick steering amount instruction is the instruction to exit the preset flight mode.

Optionally, the instruction to exit the preset flight mode may also be a remote control instruction. Specifically, the user can issue an instruction through an exit confirmation button on the control device coupled to the aircraft. When the user presses the button, a remote control instruction may be generated and sent to the aircraft. The mapping relationship between the button and the exit from the preset flight mode may be preset.

Optionally, the instruction to exit the preset flight mode may also be a preset App instruction. Specifically, the user may issue an instruction through a preset App on a terminal bound to the aircraft. When the user clicks a target area of the preset App control interface, a preset App instruction may be generated and sent to the aircraft. The mapping relationship between the target area and the exit from the preset flight mode may be preset.

The instruction for exiting the preset flight mode may also be any combination of the above-mentioned stick steering amount instruction, remote control instruction, and preset App instruction.

Accordingly, the preset flight mode may be, but is not limited to, a fixed-wing flight mode.

The method may further include exiting the preset flight mode.

The embodiments of the present disclosure may provide multiple control instructions for the aircraft to exit the preset flight mode, and cause the aircraft to exit the preset flight mode.

The following describes a gimbal servo control apparatus and control device according to some embodiments of the present disclosure.

Figure 12:
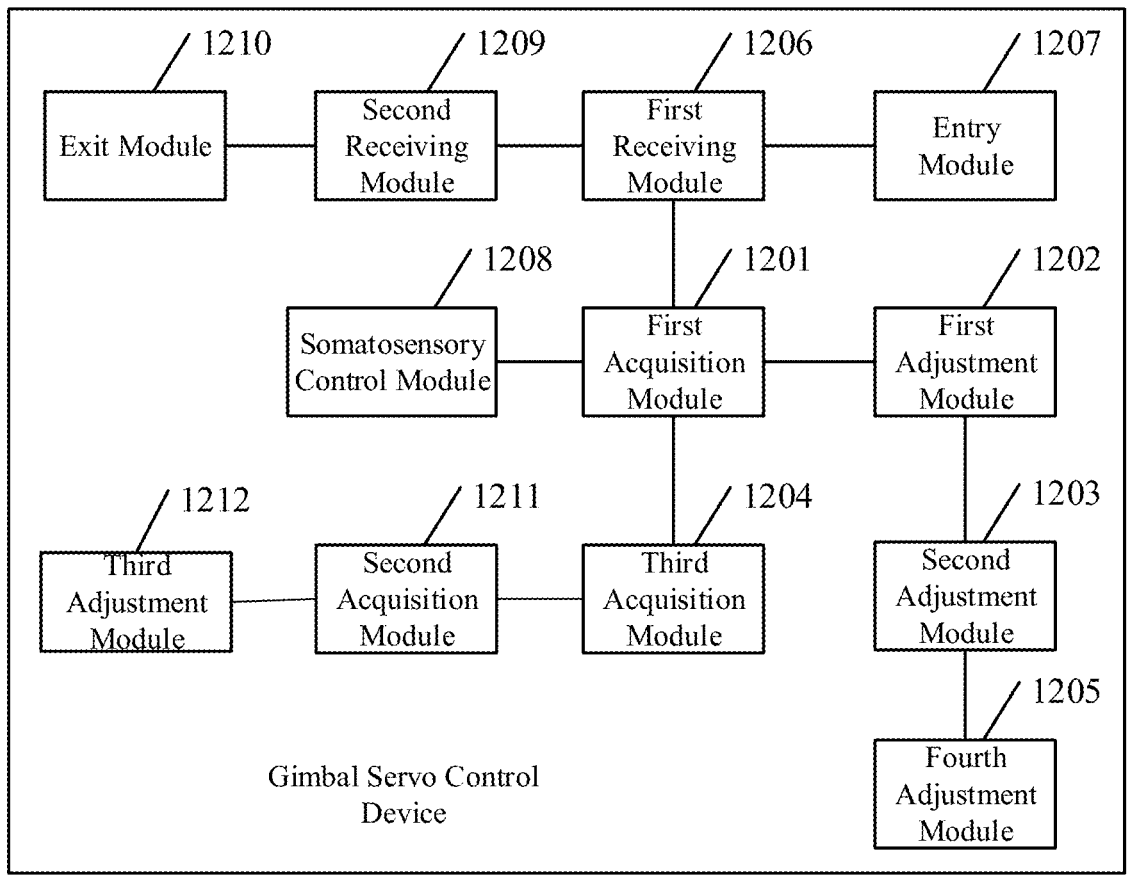
FIG. 12 is a schematic structural diagram of a gimbal servo control device according to some embodiments of the present disclosure.

FIG. 12 is a schematic structural diagram of a gimbal servo control apparatus according to some embodiments of the present disclosure. The apparatus according to the embodiments of the present disclosure may be disposed on an aircraft as a control apparatus, or may be provided on certain smart terminals in other embodiments. Specifically, the apparatus includes the following modules.

The first acquisition module 1201 is configured to acquire a predicted flight trajectory of the aircraft within a preset time period from a current time. The first adjustment module 1202 is configured to adjust the attitude of the gimbal carried by the aircraft according to the predicted velocity direction of the aircraft on one point of the predicted flight trajectory.

In an optional embodiment, the first acquisition module 1201 is specifically configured to obtain a current position of the aircraft and a preset flight trajectory and determine a predicted flight trajectory according to the current position and the preset flight trajectory.

In an optional embodiment, the first acquisition module 1201 is specifically configured to obtain a current flight status of the aircraft; and determine the predicted flight trajectory according to the current flight status.

In an optional embodiment, the first acquiring module 1201 is further specifically configured to: obtain the control instruction for the aircraft input by a user; and determine a predicted flight trajectory according to the control instruction and the current flight status.

In an optional embodiment, the first adjustment module 1202 is configured to: determine the predicted velocity direction of the aircraft at a point on the predicted flight trajectory according to the predicted flight trajectory; calculate the angle information according to the determined predicted velocity direction; and adjust the pitch angle and/or yaw angle of the gimbal carried by the aircraft according to the angle information.

In an optional embodiment, the device may further include a second adjustment module 1203 configured to adjust the roll angle of the gimbal according to the predicted centripetal acceleration of the aircraft at the point.

In an optional embodiment, the second adjustment module 1203 is specifically configured to adjust the roll angle of the gimbal according to the predicted velocity value and the trajectory radius of the aircraft at one of the points. The tangent value of the roll angle of the gimbal is proportional to the square of the velocity value, and inversely proportional to the trajectory radius.

In an optional embodiment, the apparatus may further include: a second acquisition module 1211 configured to obtain the roll angle information of the aircraft, and a third adjustment module 1212 configured to adjust the roll angle of the aircraft according to the roll angle of the gimbal.

In an optional embodiment, the third adjustment module 1212 is specifically configured to adjust the roll angle of the gimbal according to the roll angle of the aircraft. The roll angle of the gimbal is proportional to the roll angle of the aircraft.

In an optional embodiment, the apparatus may further include: a third acquisition module 1204 configured to obtain stick steering amount information of the flight direction control stick on the control device coupled to the aircraft; a fourth adjustment module 1205 configured to determine the angle corresponding to the stick steering amount information obtained by the third acquisition module 1204 according to the preset mapping relationship between the stick steering amount information and the angle and adjust the roll angle of the gimbal to be the determined angle.

In an optional embodiment, the point is a point on the first half of the predicted flight trajectory.

In an optional embodiment, the point is a point on the second half of the predicted flight trajectory.

Accordingly, the point can also be a start point or an end point of the predicted flight trajectory.

In an optional embodiment, the apparatus may further include a first receiving module 1206 configured to receive an instruction to enter a preset flight mode before the first acquisition module 1201 obtains a predicted flight trajectory of the aircraft within a preset time period from a current time, and an entry module 1207 configured to enter the preset flight mode.

In an optional embodiment, the instruction to enter the preset flight mode includes at least one of: a stick instruction, a remote control instruction, a preset App instruction, and a toss-to-fly instruction. The entry module 1207 is specifically configured to enter the preset flight mode when determining that the velocity of the aircraft satisfies the preset condition and no obstacle is detected within the preset range.

In an optional embodiment, the apparatus may further include a somatosensory control module 1208 configured to control the aircraft according to the somatosensory control signal generated by the mobile terminal bound to the aircraft.

In an optional embodiment, the somatosensory control module 1208 is specifically configured to: obtain a somatosensory control signal generated by the mobile terminal; and determine flight action information of the aircraft according to the mapping relationship between the somatosensory control signal and the flight action information of the aircraft, and adjust a flight action of the aircraft. The somatosensory control signal is generated according to motion data when the mobile terminal calls the motion sensor In an optional embodiment, the apparatus may further include: a second receiving module 1209 configured to receive an instruction to exit the preset flight mode; and an exit module 1210 configured to exit the preset flight mode.

For the specific implementation of each module of the device in the embodiments of the present disclosure, reference may be made to the description of related content in the foregoing embodiments.

In the embodiments of the present disclosure, the attitude of the gimbal carried by the aircraft can be adjusted based on the predicted velocity direction at a point on the predicted flight trajectory of the aircraft within the preset time period from the current time, to bind the attitude of the gimbal to the flight trajectory based on the velocity direction, which better ensures that the attitude of the gimbal can be automatically adjusted according to the flight trajectory and satisfies the need to adjust the attitude of the gimbal automatically and intelligently.

Figure 13:
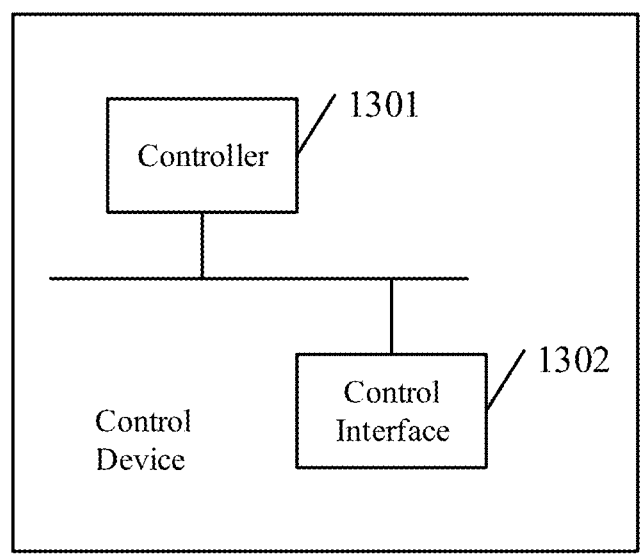
FIG. 13 is a schematic structural diagram of a control device according to some embodiments of the present disclosure.

FIG. 13 is a schematic structural diagram of a control device according to some embodiments of the present disclosure. The control device according to the embodiments of the present disclosure may be a separate control device, including a user interface such as a touch screen, a wired or wireless communication interface, and other modules such as power supply. The control device in the embodiments of the present disclosure may also be specifically a smart terminal such as a smart phone, a tablet computer, and a smart wearable device. The control device according to the embodiments of the present disclosure may also be provided on an aircraft and be connected to other devices through the wireless or wired communication interface, and may send and receive control signals and perform corresponding processing.

The control device may include a controller 1301 and a control interface 1302. The controller 1301, the control interface 1302, and the memory may be connected. The control interface 1302 may be an interface circuit, and the controller 1301 may send corresponding data or control signals to the gimbal through the interface circuit to adjust an attitude of the gimbal. The controller 1301 may be implemented by a central processing unit (CPU), or may be implemented by a programmable device such as a field-programmable gate array (FPGA).

In the embodiments of the present disclosure, the controller 1301 is configured to obtain a predicted flight trajectory of the aircraft within the preset time period from the current time and adjust the attitude of the gimbal carried by the aircraft through the control interface 102 according to the predicted velocity direction of the aircraft at a point on the predicted flight trajectory.

In an optional embodiment, the controller 1301 is configured to obtain a current position of the aircraft and a preset flight trajectory when being configured to obtain the predicted flight trajectory of the aircraft from within the preset time period from the current time, and determine the predicted flight trajectory according to the current position and the preset flight trajectory.

In an optional embodiment, the controller 1301 is configured to obtain a current flight status of the aircraft when being configured to obtain the predicted flight trajectory of the aircraft within the preset time period from the current time, and determine the predicted flight trajectory according to the current flight status.

In an optional embodiment, the controller 1301 is configured to obtain a control instruction for the aircraft input by a user when being configured to obtain the predicted flight trajectory of the aircraft within preset time period and determine the predicted flight trajectory according to the control instruction and the current flight status.

In an optional embodiment, the controller 1301 is configured to determine the predicted velocity direction of the aircraft at the point on the predicted flight trajectory when being configured to adjust the attitude of a gimbal carried by the aircraft according to the predicted velocity of the aircraft at the point on the predicted flight trajectory; and calculate the angle information according to the predicted velocity direction, and adjust the pitch angle and/or yaw angle of the gimbal carried by the aircraft according to the angle information.

In an optional embodiment, the controller 1301 is further configured to adjust the roll angle of the gimbal according to the predicted centripetal acceleration of the aircraft at the point.

In an optional embodiment, the controller 1301 is configured to adjust the roll angle of the gimbal according to the velocity value and the trajectory radius at the point when being configured to adjust the roll angle of the gimbal according to the predicted centripetal acceleration of the aircraft at the above point. The tangent value of the roll angle of the gimbal is proportional to the square of the velocity value. and inversely proportional to the trajectory radius.

In an optional embodiment, the controller 1301 is further configured to obtain the roll angle information of the aircraft and adjust the roll angle of the gimbal according to the roll angle information of the aircraft.

In an optional embodiment, the controller 1301 is configured to adjust the roll angle of the gimbal according to the roll angle information of the aircraft when being configured to adjust the roll angle of the aircraft according to the roll angle information of the aircraft. The roll angle of the gimbal is proportional to the roll angle of the aircraft.

In an optional embodiment, the controller 1301 is further configured to: obtain stick steering amount information of the flight direction control stick of a control device coupled to the aircraft; determining an angle corresponding to the stick steering amount information according to a preset mapping relationship between the stick steering amount information and the angle; and adjusting the roll angle of the gimbal to be the determined angle.

In an optional embodiment, the point is a point on a first half of the predicted flight trajectory.

In an optional embodiment, the point is a point on a second half of the predicted flight trajectory.

Accordingly, the point can also be a start point or an end point of the predicted flight trajectory.

In an optional embodiment, before obtaining the predicted flight trajectory of the aircraft within the preset time period from the current time, the controller 1301 is further configured to receive an instruction to enter the preset flight mode and enter the preset flight mode.

In an optional embodiment, the instruction to enter the preset flight mode includes at least one of: a stick instruction, a remote control instruction, a preset App instruction, and a toss-to-fly instruction. The controller 1301 is configured to enter the preset flight mode when determining that the aircraft satisfies the preset condition and no obstacle is detected within the preset range at the time of entering the preset flight mode.

In an optional embodiment, the controller 1301 is further configured to control the aircraft according to the somatosensory control signal generated by the mobile terminal bound to the aircraft.

In an optional embodiment, the controller 1301 is configured to: obtain the somatosensory control signal generated by the mobile terminal when being configured to control the aircraft through a mobile terminal bound to the aircraft, the somatosensory control signal being generated by the mobile terminal based on the motion data after the mobile terminal calling the motion sensor to measure the motion data at the mobile terminal; and determine the flight action information of the aircraft and adjust a flight action of the aircraft according to a mapping relationship between the somatosensory control signal and the flight action information of the aircraft.

In an optional embodiment, the controller 1301 is further configured to receive an instruction to exit the preset flight mode and exit the preset flight mode.

For specific implementation of the controller 1301 in the control device of the embodiment of the present disclosure, reference may be made to specific implementation of corresponding steps or modules in the foregoing embodiments.

In the embodiments of the present disclosure, the attitude of the gimbal carried by the aircraft can be adjusted based on the predicted velocity direction of the aircraft at a point on the predicted flight trajectory within the preset time period from the current time, to bind the attitude of the gimbal to the flight trajectory based on the velocity direction, which better ensures that the attitude of the gimbal can be automatically adjusted according to the flight trajectory and satisfies the need to adjust the attitude of the gimbal automatically and intelligently.

It can be understood that the above disclosure is only some the embodiments of the present disclosure, and of course, the scope of the present disclosure cannot be limited by this. Those of ordinary skill in the art can understand that all or part of the process to implement the above embodiments and their equivalents according to the claims of the present disclosure still falls within the scope of the disclosure.

What is claimed is:

1. A gimbal servo control method, comprising:
obtaining, by at least one processor, a predicted flight trajectory of an aircraft within a preset time period from a current time; and
controlling, by the at least one processor, a gimbal carried by the aircraft to change an attitude of the gimbal according to a predicted velocity direction of the aircraft at a point of the predicted flight trajectory, the attitude of the gimbal being bound to the predicted flight trajectory based on the predicted velocity direction.

2. A control device, comprising:
   at least one control interface;
   at least one processor; and
   at least one memory including computer program code, wherein the at least one memory and the computer program code are configured, with the at least one processor, to cause the control device to at least:
   obtain a predicted flight trajectory of an aircraft within a preset time period from a current time and control a gimbal carried by the aircraft to change an attitude of the gimbal through the control interface according to a predicted velocity direction of the aircraft at a point of the predicted flight trajectory, the attitude of the gimbal being bound to the predicted flight trajectory based on the predicted velocity direction.

3. The device according to claim 2, wherein to obtain the predicted flight trajectory of the aircraft within the preset time period from the current time, the at least one memory and the computer program code are further configured, with the at least one processor, to cause the control device to at least:
   obtain a current position of the aircraft and a preset flight trajectory; and
   determine the predicted flight trajectory according to the current position and the preset flight trajectory.

4. The device according to claim 2, wherein to obtain the predicted flight trajectory of the aircraft within the preset time period from the current time, the at least one memory and the computer program code are further configured, with the at least one processor, to cause the control device to at least:
   obtain a current flight status of the aircraft; and
   determine the predicted flight trajectory according to the current flight status.

5. The device according to claim 4, wherein to obtain the predicted flight trajectory of the aircraft within the preset time period from the current time, the at least one memory and the computer program code are further configured, with the at least one processor, to cause the control device to at least:
   obtain a control instruction for the aircraft input by a user; and
   determine the predicted flight trajectory according to the control instruction and the current flight status.

6. The device according to claim 2, wherein the at least one memory and the computer program code are further configured, with the at least one processor, to cause the control device to at least:
   adjust a roll angle of the gimbal according to a predicted centripetal acceleration of the aircraft at the point.

7. The device according to claim 6, wherein to adjust the roll angle of the gimbal according to the predicted centripetal acceleration of the aircraft at the point, the at least one memory and the computer program code are further configured, with the at least one processor, to cause the control device to at least:
   adjust the roll angle of the gimbal according to a velocity value and a trajectory radius of the aircraft at the point;
   wherein a tangent value of the roll angle of the gimbal is proportional to a square of the velocity value, and inversely proportional to the trajectory radius.

8. The device of claim 2, wherein the at least one memory and the computer program code are further configured, with the at least one processor, to cause the control device to at least:
   obtain roll angle information of the aircraft; and
   adjust a roll angle of the gimbal according to the roll angle information of the aircraft.

9. The device according to claim 8, wherein to adjust the roll angle of the gimbal according to the roll angle information of the aircraft, the at least one memory and the computer program code are further configured, with the at least one processor, to cause the control device to at least:
   adjust the roll angle of the gimbal according to a roll angle of the aircraft, the roll angle of the gimbal being proportional to the roll angle of the aircraft.

10. The device of claim 2, wherein the at least one memory and the computer program code are further configured, with the at least one processor, to cause the control device to at least:
    obtain stick steering amount information of a flight direction control stick of a control device coupled to the aircraft; and
    determine an angle corresponding to the obtained stick steering amount information and adjust a roll angle of the gimbal to be the determined angle according to a preset mapping relationship between the stick steering amount information and the angle.

11. The device according to claim 2, wherein:
    the point is on a first half of the predicted flight trajectory; or
    the point is on a second half of the predicted flight trajectory.

12. The device according to claim 2, wherein, before to obtain the predicted trajectory within the preset time period from the current time, the at least one memory and the computer program code are further configured, with the at least one processor, to cause the control device to at least:
    receive an instruction to enter a preset flight mode; and
    control the aircraft to enter the preset flight mode.

13. The device according to claim 12, wherein the instruction to enter the preset flight mode comprises at least one of: a stick steering amount instruction, a remote control instruction, a preset App instruction, or a toss-to-fly instruction.

14. The device according to claim 12, wherein to enter the preset flight mode, the at least one memory and the computer program code are further configured, with the at least one processor, to cause the control device to at least:
    in response to determining that a velocity of the aircraft satisfies a preset condition and no obstacle is detected within a preset range, control the aircraft to enter the preset flight mode.

15. The device according to claim 12, wherein, after controlling the gimbal carried by the aircraft to change the attitude of the gimbal according to the predicted velocity direction of the aircraft at the point on the predicted flight trajectory, the at least one memory and the computer program code are further configured, with the at least one processor, to cause the control device to at least:
    receive an instruction to exit the preset flight mode; and
    exiting control the aircraft to exit the preset flight mode.

16. The device of claim 2, wherein the at least one memory and the computer program code are further configured, with the at least one processor, to cause the control device to at least:
    control the aircraft according to a somatosensory control signal generated by a mobile terminal bound to the aircraft.

17. The device according to claim 16, wherein to control the aircraft by the mobile terminal bound to the aircraft, the at least one memory and the computer program code are further configured, with the at least one processor, to cause the control device to at least:

obtain the somatosensory control signal generated by the mobile terminal, the somatosensory control signal being generated by the mobile terminal based on motion data of the mobile terminal detected by a motion sensor; and according to a mapping relationship between the somatosensory control signal and flight action information of the aircraft, determine the flight action information of the aircraft, and adjust flight action of the aircraft.

18. The device according to claim 2, wherein to control the gimbal carried by the aircraft to change the attitude of the gimbal through the control interface according to a predicted velocity direction of the aircraft at a point of the predicted flight trajectory, the at least one memory and the computer program code are further configured, with the at least one processor, to cause the control device to at least:

determine the predicted velocity direction of the aircraft at the point on the predicted flight trajectory according to the predicted flight trajectory; and calculate angle information according to the predicted velocity direction, and adjust a pitch angle and/or a yaw angle of the gimbal carried by the aircraft according to the angle information.

19. The device according to claim 2, wherein before to obtain the predicted trajectory within the preset time period from the current time, the at least one memory and the computer program code are further configured, with the at least one processor, to cause the control device to at least:

receive an instruction to enter a preset flight mode, the instruction including a stick steering amount instruction or a toss-to-fly instruction; and control the aircraft to enter the preset flight mode.

20. A control device, comprising:
at least one control interface;
at least one processor; and
at least one memory including computer program code, wherein in response to receiving an instruction generated in response to a sensor at a vehicle detecting that the vehicle is released from a hand of a user, the at least one memory and the computer program code are configured, with the at least one processor, to cause the control device to at least:

obtain a predicted motion trajectory of the vehicle within a preset time period from a current time; and control a gimbal carried by the vehicle to change an attitude of the gimbal through the control interface according to a predicted velocity direction of the vehicle at a point of the predicted motion trajectory.

* * * * *